(12) United States Patent
Kadula et al.

(10) Patent No.: US 12,434,900 B2
(45) Date of Patent: Oct. 7, 2025

(54) AEROSOL METERING VALVE SYSTEM AND A CONTAINER COMPRISING AN AEROSOL METERING VALVE SYSTEM

(71) Applicants: Marcin Kadula, Jaworzno (PL); Wieslaw Kadula, Jaworzno (PL); Sebastian Korczyk, Jaworzno (PL); Stanislaw Korczyk, Jaworzno (PL)

(72) Inventors: Marcin Kadula, Jaworzno (PL); Wieslaw Kadula, Jaworzno (PL); Sebastian Korczyk, Jaworzno (PL); Stanislaw Korczyk, Jaworzno (PL)

( * ) Notice: Subject to any disclaimer, the term of this patent is extended or adjusted under 35 U.S.C. 154(b) by 262 days.

(21) Appl. No.: 18/038,336

(22) PCT Filed: Nov. 22, 2021

(86) PCT No.: PCT/IB2021/060831
§ 371 (c)(1),
(2) Date: May 23, 2023

(87) PCT Pub. No.: WO2022/107096
PCT Pub. Date: May 27, 2022

(65) Prior Publication Data
US 2023/0415973 A1   Dec. 28, 2023

(30) Foreign Application Priority Data
Nov. 23, 2020  (PL) .......................... 436052

(51) Int. Cl.
*B65D 83/52* (2025.01)
*B65D 83/20* (2006.01)
*B65D 83/42* (2006.01)

(52) U.S. Cl.
CPC ............. *B65D 83/52* (2013.01); *B65D 83/20* (2013.01); *B65D 83/425* (2013.01)

(58) Field of Classification Search
CPC ...... B65D 83/52; B65D 83/20; B65D 83/425; B65D 83/68
See application file for complete search history.

(56) References Cited

U.S. PATENT DOCUMENTS 3,001,524 A * 9/1961 Maison ............... A61M 15/009
222/402.2
3,616,971 A * 11/1971 Kutik ..................... B65D 83/66
222/384

(Continued)

FOREIGN PATENT DOCUMENTS

EP     1283180 A2    2/2003

OTHER PUBLICATIONS

PCT International Search Report in PCT/IB2021/060831 mailed Mar. 30, 2022, 2 pages.

(Continued)

*Primary Examiner* — Vishal Pancholi
(74) *Attorney, Agent, or Firm* — SERVILLA WHITNEY LLC (57) ABSTRACT

The object of the invention is an aerosol metering valve system for dispensing a metered dose of product comprising: a metering chamber defined by a side wall, a top wall and a bottom wall, a charging port extending from the bottom wall of the metering chamber, a releasing stem extending from the top wall of the metering chamber, wherein the releasing stem is connected with a stem block extending towards the charging port, a piston arranged in the metering chamber and moveable in the metering chamber, a piston spring arranged in the metering chamber, resting with its one end against the piston and exerting pressure on the piston towards the charging port, wherein there is a charging channel arranged coaxially in the metering chamber, wherein the piston tightly surrounds the charging channel, wherein the charging channel has a charging opening closed by a closure and connect- (Continued)

ing the charging channel with the propulsion space under the piston and/or the charging port, and the charging channel has a dose opening connecting the charging channel with the dose space above the piston.

20 Claims, 6 Drawing Sheets

(56) References Cited

U.S. PATENT DOCUMENTS

| | | | |
|---|---|---|---|
| 5,025,962 A * | 6/1991 | Renfro | B65D 83/388 |
| | | | 222/61 |
| 8,820,588 B2 | 9/2014 | Ghavami-Nasr et al. | |
| 10,399,767 B2 | 9/2019 | Plaschkes et al. | |
| 2010/0051653 A1 | 3/2010 | Miller et al. | |

OTHER PUBLICATIONS

PCT International Preliminary Report on Patentability and Written Opinion in PCT/IB2021/060831 mailed May 16, 2023, 7 pages.

* cited by examiner

AEROSOL METERING VALVE SYSTEM AND A CONTAINER COMPRISING AN AEROSOL METERING VALVE SYSTEM

CROSS-REFERENCE TO RELATED APPLICATIONS

This application is a National Phase entry of International Application No. PCT/IB2021/060831, filed Nov. 22, 2021, which claims priority to Poland Patent Application No. P.436052, filed Nov. 23, 2020, the disclosures of which are incorporated herein by reference in their entireties.

The present invention relates to an aerosol metering valve system and a container comprising such an aerosol metering valve system. The objects of the invention are applied inter alia in pharmaceutical, food, cosmetic, and chemical industries, particularly for storing and dispensing agents at a predefined volume (dose).

In recent years, a dynamic development of aerosol technologies, which allows the storing and administering of a wide range of products, has been observed. Aerosol containers have gained enormous popularity, as they offer efficiency, convenience and safety of use. Generally, an aerosol container is a disposable or reusable vessel, made of metal, glass, or plastic, containing pressurized, liquefied, or dissolved gas. Aerosol containers can also contain liquid, paste or powder, and are usually equipped with a dispensing device, enabling the application of the product in a form of solid or liquid particles suspended in gas, or in a form of foam, paste, or powder, or in a liquid or gaseous state. A classic aerosol container contains a sprayed agent (e.g. in liquid form) and a propellant, being a fluid or a gas under pressure. Triggering the aerosol valve causes the valve to be opened and the sprayed agent to be discharged by the pressurized propellant towards the outlet, usually ended with a dispensing head, thus creating a finely dispersed stream.

Aerosol packages gained their popularity due to a number of advantages that they offer. Products stored in aerosol packages usually have long lifespan, mainly because of a hermetic sealing which prevents the contact between the stored product and the environment, especially pollutants and microorganisms. This advantage is particularly appreciated for storing pharmaceutical agents, where maintaining maximal purity is an essential factor. It should also be noted that, in time of a rising issue of global pollution, it is desirable to use packages that are mostly suitable for recycling, which the aerosol packages undoubtedly are, since they are usually manufactured from aluminum and plastic, almost entirely suitable for reprocessing.

In some branches of industry, aerosol systems are slow to gain appreciation and thus are not often the first choice for dispensing components. An especially demanding branch of industry is the pharmaceutical industry, in which medical substances must be dispensed under very stringent conditions. It is particularly important to provide the dispensation of a medical substance at a precisely metered dose, which frequently translates into the volume of this pharmaceutical substance. It is vital for controlling the particular amount of an active medical substance delivered to the organism. It is equally important to maintain highly repeatable metering of the doses of the dispensed substance, particularly in the case when the volume in the dispensing container decreases at every act of dispensing.

Another U.S. patent application No. US2015239645A1 discloses a valve system for dosing a predetermined quantity of content, particularly in the form of foam. The valve system comprises a cap which is mounted on the valve and which houses a metering chamber. The volume of a dose is regulated by turning the cap and thus by changing the volume of the metering chamber. The system is based on a valve, which fills the metering chamber during the phase of pushing the stem, and which opens the discharge to the dispensing nozzle and discharges the contents outside the metering chamber during the phase of releasing the stem.

U.S. Pat. No. 3,301,444A discloses an aerosol valve allowing a predetermined measured volume of product to be dispensed, the valve comprising a measuring chamber, which has its volume defined by the dose, and which is filled with the product when the valve is in closed position. The pressing of an actuator stem closes the metering chamber inlet aperture and opens the discharge outlet through the dispensing head. In such a case, the valve discharges the volume of a product contained in the measuring chamber.

A container for dispensing a dose of the product is also known from U.S. Pat. No. 5,031,802A. The container comprises a valve system fitted inside a bottleneck. The valve system comprises a metering chamber. The metering chamber is made of an elastic material in the form of a bellows. In order to discharge a metered dose of a product, a cap must be first removed. The removal of the cap causes the volume of the metering chamber to increase and creates a negative pressure. The negative pressure frees a ball which blocks a conduit connected with a plunger tube. In this manner, the conduit is opened and the metering chamber is filled with the product. Complete unscrewing of the cap breaks the fluid-tightness and causes the ball to drop. Thus the user is provided with a metered volume of a product.

International patent application No. WO2019125566A1 discloses an aerosol valve system for dispensing a product from a pressurized container. The aerosol valve system comprises a metering valve which dispenses a predetermined fixed quantity of product upon actuation. The metering valve comprises a housing with a cylindrical body, an open upper portion, a planar base and an outer surface and an aperture through the planar base. The metering valve moreover comprises a metering chamber having an upper cylindrical portion with an open end and a lower cylindrical portion with an open end, wherein a piston is disposed in the lower cylindrical body and preloaded with a spring. During the filling process of the metering chamber, the metered product flows around the outside of the metering chamber and into the inside of the metering chamber through an upper aperture. The pressure exerted by the metered product together with the force exerted by the spring cause the piston to be moved to the lowermost position, i.e. to a position in which the dose is ready to be dispensed. The pushing of the metering stem prevents the product in the vessel of the aerosol container from accessing the metering chamber and opens the channels leading to the discharge in the form of a cylindrical stem. The pressure exerted on the piston causes the piston to be moved vertically upwards and the product present in the upper portion of the metering chamber to be ejected, which in turn ensures that a defined volume (dose) of the product is dispensed. Releasing the stem causes the system to return to the metering chamber filling stage.

The technical problem of the present invention is to provide an aerosol metering valve system and a container comprising such an aerosol metering valve system which would allow an accurately metered volume of a product to be dispensed while maintaining highly repeatable doses until the container is completely emptied, this being achieved regardless of the surrounding conditions such as ambient temperature or the viscosity of the dispensed product. It is also desirable that the aerosol metering valve system has a relatively simple construction, which would in particular not influence the structure and external dimensions of the aerosol metering valve system and of the container comprising such a system. It is moreover desirable to provide such an aerosol metering valve system, in which the dispensed product is not in contact with the propellant gas. Moreover, it is desirable to provide an aerosol metering valve system having reduced external dimensions and increased operating reliability. It is also desired that the aerosol metering valve system is a universal solution suitable for use in standard aerosol containers, and is exchangeable, wherein the introduction of the aerosol metering valve system on the aerosol container does not require the use of specialist tools.

According to the first aspect of the present invention, there is provided an aerosol metering valve system for dispensing a metered dose of product comprising: a metering chamber defined by a side wall, a top wall and a bottom wall, a charging port extending from the bottom wall of the metering chamber, a releasing stem extending from the top wall of the metering chamber, wherein the releasing stem is connected with a stem block extending towards the charging port, a piston arranged in the metering chamber and moveable in the metering chamber, a piston spring arranged in the metering chamber, resting with its one end against the piston and exerting pressure on the piston towards the charging port, characterized in that there is a charging channel arranged coaxially in the metering chamber, wherein the piston tightly surrounds the charging channel, wherein the charging channel has a charging opening closed by a closure and connecting the charging channel with the propulsion space under the piston and/or the charging port, and in that the charging channel has a dose opening connecting the charging channel with the dose space above the piston.

Preferably, the charging channel is a bush extending coaxially through the metering chamber in which there is arranged a moveable stem block.

Preferably, the charging channel is hollowed out in the stem block.

Preferably, a filling check valve is provided in the stem block.

Preferably, the filling check valve is a ball or a sealing piston subjected to a force exerted by a spring pressing towards the releasing stem.

Preferably, the aerosol metering valve system is in a form of an adapter for mounting to an aerosol container and is provided with a mounting assembly.

Preferably, the mounting assembly is provided with at least one circumferentially arranged mounting hook for a snap fit connection with the flange of the aerosol container or with the flange of the aerosol container head.

Preferably, the charging port is a male valve connector or a female valve connector.

Preferably, the aerosol metering valve system has a dispensing nozzle.

Preferably, the aerosol metering valve system has, on its external surface around the releasing stem, an adapter annular flange arranged protruding in the direction opposite to the charging port and having its geometrical dimensions substantially corresponding to the dimensions of the flange of the aerosol container.

Preferably, the aerosol metering valve system is arranged inside the aerosol container.

Preferably, the charging opening is located in the charging channel, at the proximal end relative to the charging port, and the dose opening is located in the charging channel at the proximal end relative to the releasing stem.

Preferably, the aerosol metering valve system additionally comprises a viewing region provided within the metering chamber and made of a transparent or a partially transparent material and extending along the metering chamber, on its side wall, at least within the movement range of the piston.

Preferably, the aerosol metering valve system additionally comprises a limiting structure for limiting the movement of the piston.

According to the second aspect of the present invention, there is provided a container for storing and dispensing a product of a predefined dose, comprising an outer casing, and an aerosol metering valve system, characterized in that the aerosol metering valve system is an aerosol metering valve system as defined in the first aspect of the invention.

The aerosol metering valve system according to the present invention, owing to the use of the metering chamber with the piston moveable inside, the piston being propelled by the pressure exerted by the product from the aerosol container, is a solution providing a precisely metered dose of the product without the need to use complicated propelling structures and positively influencing the reliability of the structure of the system and ensuring highly repeatable doses. The use of a piston spring exerting pressure on the piston towards the charging port ensures the movement of the piston to the terminal charged position of the metering chamber as the dose space of the metering chamber is being filled. The aerosol metering valve system made in the form of an adapter mounted on an aerosol container provides universal applicability to the solution of this invention, allowing it to be used with the currently existing aerosol containers. The use of the mounting assembly based on the mounting hook allows the adapter to be fitted without the need to use complicated tools and thus the fitting may be performed by the end users. On the other hand, the use of the viewing region allows the observation of whether the piston reached its terminal position and thus the verification of whether the metering chamber is properly charged and whether a defined dose volume is properly dispensed. Additionally, the use of limiting structures, which are implemented at the stage of mounting the aerosol metering valve system, allows the volume of the dispensed dose to be changed, and as a result makes the solution of this invention universal.

On the other hand, by making the aerosol metering valve system in a form integrated with the aerosol container, in which the aerosol metering valve system is arranged in the inner space of the aerosol container, it is possible to provide an aerosol container which has a dose-metering functionality and a very compact structure and which does not differ, in a manner visible to the end user, from standard solutions without such a functionality.

Importantly, the construction of the piston in a such a form that it surrounds the charging channel causes the operating piston to move being guided along the charging channel, thus stabilizing the movement of the piston and allowing its dimensions to be reduced (as the risk of angular inclination of the piston and of the loss of tightness between the dose space and the propulsion space is reduced). As a result, the aerosol metering valve system has reduced external dimensions, influencing the compactness of the design and increased operating reliability.

Moreover, the aerosol metering valve system of the invention, in the form of an adapter, comprises an adapter flange, which precisely represents the flange of the aerosol container, and thus it is possible to use metering caps used in standard aerosol containers.

The subject matter of the invention is not limited to the embodiments disclosed in the attached examples and can be applied to valves of any types and configurations, without diverting from the scope of the invention. All valve constructions, their positions and their relative arrangement (including vertical, horizontal, and diagonal configurations) known to a person skilled in the art will be suitable for application in the present invention, and the given embodiments are not intended to limit the invention to the disclosed structures and types of valve systems.

Exemplary embodiments of the invention are presented in the drawing, in which.

EXAMPLE 1

Figure 1:
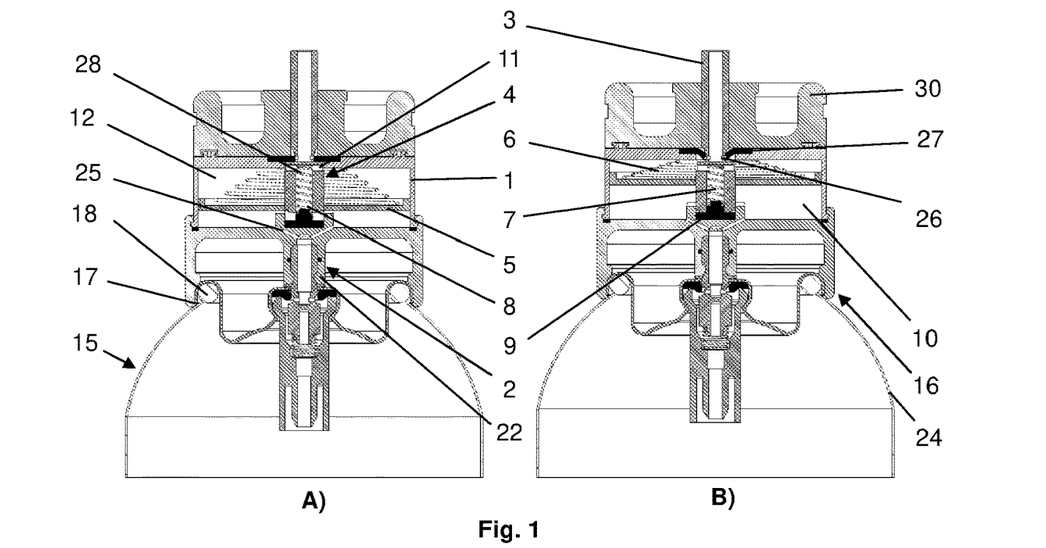
FIGS. 1A-B are a partial longitudinal cross-section of the first embodiment of the aerosol metering valve system according to the invention.

The first embodiment of the container for storing and dispensing a product of a predefined dose comprising the aerosol metering valve system of the invention is shown in a partial longitudinal cross-section in FIGS. 1A-B. In this embodiment, the aerosol metering valve system takes the form of an adapter mounted on an aerosol container 15, but this is not a limitation to the scope of the invention and in alternative embodiments it is possible to have a structure of the aerosol metering valve system which is integrated with the aerosol container 15 or is arranged inside the aerosol container 15.

The aerosol metering valve system in the form of an adapter is a separate structural element which is intended for mounting on the aerosol container 15. Generally, the aerosol metering valve system of this invention comprises a metering chamber 1, which is defined by the top wall (distal with respect to the aerosol container 15), the side wall and the bottom wall (proximal with respect to the aerosol container 15). In this embodiment, the metering chamber 1 assumes a cylindrical shape, but this shape is not a limitation to the scope of this invention.

A charging port 2 extends from the metering chamber 1, from its bottom wall, towards the aerosol container 15. In this embodiment, in which the aerosol metering valve system takes the form of an adapter mounted on the aerosol container 15, the purpose of the charging port 2 is to provide a tight fluid connection with the aerosol container 15 for transferring the product present in the aerosol container 15, through the aerosol metering valve system, to the inner space. Importantly, the charging port 2, depending on what type of the aerosol container 15 it is dedicated to, can assume the form of a male valve connector 21 a female valve connector 22. The embodiment presented in FIGS. 1A-B is an aerosol metering valve system in the form of an adapter mounted on the aerosol container 15 with a protruding stem, i.e. with a male aerosol valve, and therefore the charging port 2 is a female valve connector 22. In alternative embodiments it is possible to use a different type of the charging port 2, also in the form of a pin, on which a vessel with the metered product, for example a bag-on-valve (BOV) known in the art, is mounted directly. Importantly, the connection of the aerosol metering valve system with the aerosol container 15 causes the aerosol valve present in the aerosol container 15 to become permanently open and the product to be constantly delivered to the inner spaces of the aerosol metering valve system.

In the metering chamber 1, there is arranged a piston 5, which is vertically moveable to its terminal positions or to the respective limiting structures. The piston 5 divides the metering chamber 1 into a propulsion space 10 which is located under the piston 5 (i.e. in the space adjacent to the charging port 2) and a dose space 12, which is located above the piston 5. In the metering chamber 1, there is additionally arranged a piston spring 6, whose ends are supported against the top wall of the metering chamber 1 and the upper surface of the piston 5. The piston spring 6 is preloaded and exerts a pressure on the piston 5 towards the charging port 2.

The charging port 2 is in fluid communication with the metering chamber 1 through respective access channels 25 which allow the product to be delivered to the metering chamber 1. As a result, the product flowing through the charging port 2 is first delivered through the access channels 25 to the propulsion space 10 of the metering chamber 1.

A releasing stem 3 extends from the top wall of the metering chamber 1. In this embodiment of the aerosol metering valve system, the releasing stem 3 and the accompanying structures are a standard solution commonly used in aerosol valve systems. In more detail, the releasing stem 3 is a pipe structure with an outlet channel extending coaxially. The releasing stem 3 is connected with the stem block 4 extending towards the charging port 2. In the region where the releasing stem 3 connects to the stem block 4, there is located an outlet opening 26 extending substantially radially through the releasing stem 3 and connecting to the outlet channel of the releasing stem 3. In the rest position of the aerosol container 15 (see FIG. 1A), the outlet opening 26 is closed by a seal 27 comprising a rubber flat ring gasket which surrounds the releasing stem 3 and is deformed from the bottom by the releasing stem 3 (see FIG. 1B). The deformation of the seal 27 causes the outlet opening 26 to open and allows the dose to be ejected through the outlet channel of the releasing stem 3 to the outside of the aerosol metering valve system. It should be observed that the releasing stem 3 and the stem block 4 are provided with all of the elements required for the proper operation of such an aerosol valve system, commonly used in the art, such as a stem spring 28 exerting pressure on the releasing stem 3 in the direction opposite with respect to the end of the charging port 2 for keeping the outlet opening 26 closed by means of a relevant seal 27 when the aerosol metering valve system is in the rest position.

A charging channel 7 extends coaxially through the metering chamber 1. At its proximal end with respect to the charging port 2, the charging channel 7 has a charging opening 8 which is closed by a closure 9 (see FIG. 1B). In this embodiment of the aerosol metering valve system, the closure 9 is a cylindrical rubber seal with a discrete change of the diameter. The closure 9 is mounted to the bottom wall of the metering chamber 1, and its upper portion has a diameter corresponding to the inner diameter of the charging opening 8 in such a manner that when in the closed position (see FIG. 1B), it tightly closes the charging opening 8, preventing the movement of the metered product. Importantly, in this embodiment of the aerosol metering valve system, the charging channel 7 is formed in the stem block 4. In its upper part, i.e. at the end proximal with respect to the releasing stem 3, the charging channel 7 has a dose opening 11 connecting the charging channel 7 with the dose space 12 above the piston 5. In this embodiment, the dose opening 11 is formed in the stem block 4 and extends substantially radially through the stem block 4.

In this embodiment of the aerosol metering valve system, the piston 5 arranged in the metering chamber 1 tightly surrounds the charging channel 7, i.e. the stem block 4, and when in operation, moves along it while preserving tightness and the separation of the propulsion space 10 from the dose space 12.

It should be noted that in the embodiment of the aerosol metering valve system shown in FIG. 1A, the piston 5 is illustrated in its lowermost position, in which a region is left which provides fluid communication between the charging opening 8 and the propulsion space 10 in the metering chamber 1 so that it is possible to completely fill the dose space 12 of the metering chamber 1.

In the region of the lower end of the side wall of the aerosol metering valve system according to this invention, there is located a mounting assembly 16 intended for detachable (or non-detachable) joining with the aerosol container 15. In practice, the aerosol metering valve system in the form of an adapter is mounted to the aerosol container 15 by mounting the adapter on the flange 18 of the aerosol container 15 defined by the folded and pressed upper lid of the aerosol container 15.

As best illustrated in FIGS. 1A and 1B, the lower end region of the side wall of the aerosol metering valve system in the form of an adapter is provided with the mounting assembly 16 extending along the circumference of the lower edge of the side wall. In this embodiment, the mounting assembly 16 takes the form of a mounting hook 17 extending on the flange side. The mounting hook 17 is a continuous structure extending along the entire circumference of the edge of the side wall of the system, but in alternative embodiments it can take a discreet form, extending circumferentially with a space provided between the consecutive mounting hooks 17. During the operation of mounting the aerosol metering valve system in the form of an adapter on the aerosol container 15, a force applied at a vertical direction towards the aerosol container 15 causes an elastic outward deformation of the lower end region of the housing side wall, thus allowing the flange 18 of the aerosol container 15 to be introduced into the inner annular circumferential recess (not shown) adjacent to the mounting hook 17 on the edge side in such a way that the mounting hook 17 is locked against the flange 18 of the aerosol container 15. As a result, the aerosol metering valve system in the form of an adapter can be mounted on the aerosol container 15 in a quick and relatively easy manner, without the need to use specialist tools.

Moreover, the aerosol metering valve system has, on its external surface around the releasing stem 3, an adapter annular flange 30 arranged protruding in the direction opposite to the charging port 2 and having its geometrical dimensions substantially corresponding to the dimensions of the flange 18 of the aerosol container 15. As a result, the mounting of the aerosol metering valve system on the aerosol container 15 allows further use of standard metering caps without the need to use additional fitting systems (adapting means).

The aerosol metering valve system operates in the following steps. In the case of an aerosol metering valve system in the form of an adapter, first the aerosol metering valve system should be mounted to the aerosol container 15. The mounting of the aerosol metering valve system entails introducing the valve stem of the aerosol container 15 into the charging port 2 in the form of a female valve connector 22 and a simultaneous opening of the aerosol valve in the aerosol container 15. In this state, the product flows from the aerosol container 15 through the charging port 2 and further through the access channels 25 to the metering chamber 1, where it starts to fill the propulsion space 10. Next, the product flows through the open charging opening 8 and further through the charging channel 7 formed in the stem block 4, and then flows through the dose openings 11 to the dose space 12 of the metering chamber 1. In this state, the outlet opening 26 in the releasing stem 3 remains closed. As the product flows to the dose space 12, the piston 5 starts to move towards the charging port 2, until it reaches its terminal position shown in FIG. 1A. As the pressure of the product present in the propulsion space 10 is equal to the pressure of the product present in the dose space 12, the movement of the piston 5 is aided by the pressure force due to the piston spring 6. FIG. 1A shows the state of the aerosol metering valve system in the position of being completely charged with the product flowing from the aerosol container 15.

In order to eject a product of a defined dose, i.e. of a predefined volume, the releasing stem 3 is pressed. The pressing of the releasing stem 3 causes the stem block 4 to move towards the charging port 2 and the charging opening 8 to be closed by the closure 9 in the form of a rubber seal. In this state the product can no longer flow through the charging channel 7 to the dose space 12 of the metering chamber 1. As the releasing stem 3 moves, the seal 27 is deformed, which results in the opening of the outlet opening 26 leading through the outlet channel of the releasing stem 3 to the outside of the aerosol metering valve system. In such a situation, the pressure exerted by the product on the piston 5 in the propulsion space 10 results in the vertical movement of the piston 5 towards the releasing stem 3 and in the simultaneous ejection of the product dose present in the dose space 12 of the metering chamber 1. The pressure exerted on the piston 5 by the pressurized product present in the propulsion space 10 is greater than the pressure exerted in the opposite direction by the piston spring 6. The piston 5 moves until it reaches its upper terminal position, as shown in FIG. 1B, ejecting the entire dose present in the dose space 12.

Releasing the pressing force on the releasing stem 3 causes the releasing stem 3 to return to its original position due to the pressure from the stem spring 28 and the outlet opening 26 to be closed again while the charging opening 8 is opened and the propulsion space 10 and the dose space 12 of the metering chamber 1 are filled until reaching the position shown in FIG. 1A, i.e. until reaching a state of readiness to eject another dose of a predefined volume.

EXAMPLE 2

Figure 2:
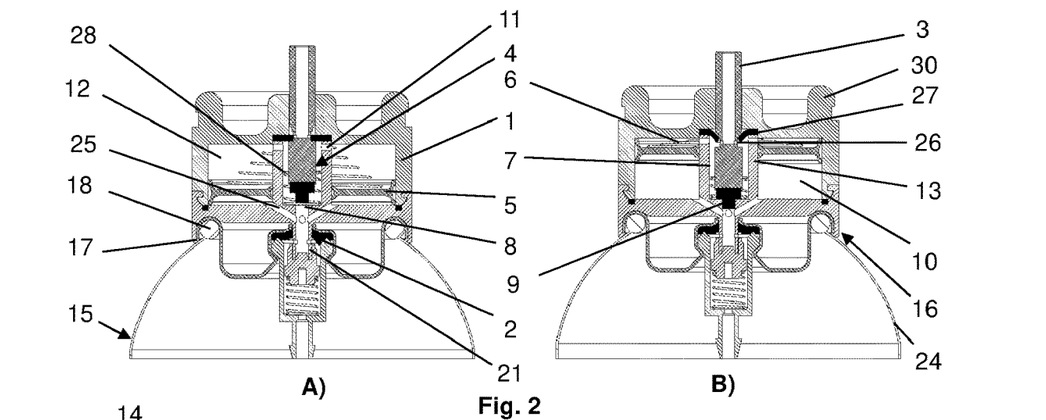
FIGS. 2A-B are a partial longitudinal cross-section of the second embodiment of the aerosol metering valve system according to the invention.

The second embodiment of the container for storing and dispensing a product of a predefined dose comprising an aerosol metering valve system of the present invention has been illustrated in the partial longitudinal cross-section in FIGS. 2A-B.

The container with the aerosol metering valve system is similar in construction to the construction of the container with the aerosol metering valve system presented in the first embodiment, and therefore similar components will not be described again for the clarity of this disclosure.

Unlike in the first embodiment, the second embodiment of the container with the aerosol metering valve system comprises a charging port 2 for connecting to the aerosol container 15 having a female aerosol valve (see FIGS. 2A and B). In this embodiment, the charging port 2 therefore assumes the form of a male valve connector 21 introduced into the receiving seat of the female aerosol valve of the aerosol container 15.

Another important difference lies in the construction of the charging channel 7. In this embodiment of the aerosol metering valve system, the charging channel 7 is formed by a bush 13 extending coaxially through the metering chamber 1. Inside the bush 13, there moves the stem block 4, while preserving a distance from the inner surface of the bush 13 for providing the flow of the product in the charging channel 7 thus formed. It should be additionally noted that the piston 5 tightly surrounds and moves on the outer surface of the bush 13, which is in contrast to the moving on the outer surface of the stem block 4, as was the case on the first embodiment of the aerosol metering valve system. As depicted in FIGS. 2A and B, the charging opening 8 leads directly to the channel formed in the charging port 2, bypassing the propulsion space 10 of the metering chamber 1, as was the case in the first embodiment. Due to the structure of the charging channel 7 formed by the bush 13, the dose opening 11 in the upper part of the charging channel 7 is formed in the bush 13 and not in the stem block 4, as was the case in the first embodiment.

The operating principle of the aerosol metering valve system according to the second embodiment is substantially similar to the operating principle of the aerosol metering valve system according to the first embodiment, and therefore it will not be described again here for the clarity of this disclosure.

EXAMPLE 3

Figure 3:
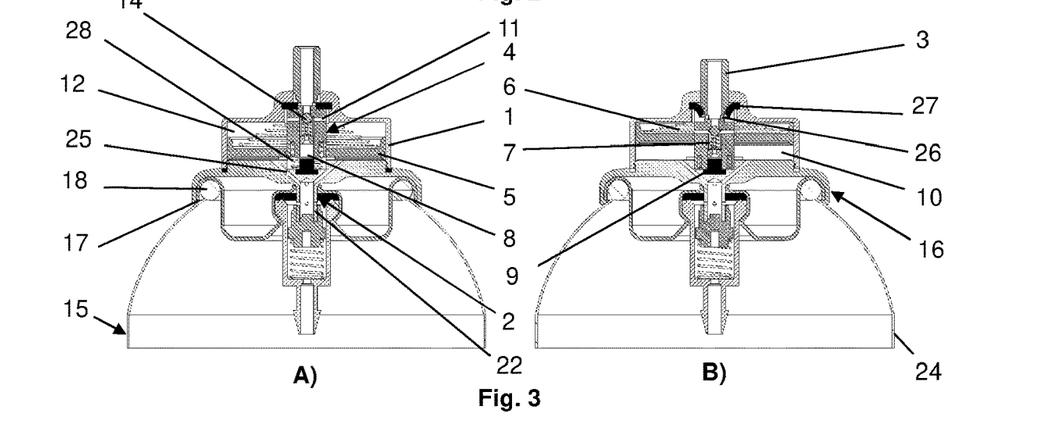
FIGS. 3A-B are a partial longitudinal cross-section of the third embodiment of the aerosol metering valve system according to the invention.

The third embodiment of the container for storing and dispensing a product of a predefined dose comprising an aerosol metering valve system of the present invention has been illustrated in the partial longitudinal cross-section in FIGS. 3A-B.

The container with the aerosol metering valve system is similar in construction to the construction of the container with the aerosol metering valve system presented in the first embodiment, and therefore similar components will not be described again for the clarity of this disclosure.

Unlike in the first embodiment, the third embodiment of the container with the aerosol metering valve system comprises a charging port 2 for connecting to the aerosol container 15 having a female aerosol valve (see FIGS. 3A and B). In this embodiment, the charging port 2 therefore assumes the form of a male valve connector 21 introduced into the receiving seat of the female aerosol valve of the aerosol container 15.

Additionally, in this embodiment of the aerosol metering valve system, there is a filling check valve 14 arranged in the stem block 4. The filling check valve 14 is a sealing ball subjected to a force exerted by a spring pressing towards the releasing stem 3, but this is not a limitation to the scope of the invention and in alternative embodiments it is possible to use a check valve 14 of a different construction, on condition that a one-way fluid communication is ensured through the releasing stem 3, such as a non-return valve design. The implemented check valve 14 is of significance in the operation of filling the aerosol container 15 and allows an effective filling of the inner vessel of the container while preserving an open charging opening 8 which provides the flow of the product through the charging port 2 and to the inner vessel. Importantly, during the operation of filling the aerosol container 15, the releasing stem 3 remains in the rest position (not pressed).

EXAMPLE 4

The fourth embodiment of the container for storing and dispensing a product of a predefined dose comprising an aerosol metering valve system of the present invention has been illustrated in the partial longitudinal cross-section in FIGS. 4A-D.

The container with the aerosol metering valve system is similar in construction to the construction of the container with the aerosol metering valve system presented in the second embodiment, and therefore similar components will not be described again for the clarity of this disclosure.

Unlike in the second embodiment, the fourth embodiment of the container with the aerosol metering valve system is a solution integrated with the aerosol container 15, and not a separate element in the form of an adapter mounted on the aerosol container 15. In this embodiment, the entire aerosol metering valve system is arranged inside the aerosol container 15, in the space inside the outer casing 24. As a consequence, the charging port 2 takes the form of a bush which is connected with the inner vessel for storing the metered product, e.g. in the form of a bag known in the BOV technology.

Additionally, the embodiment of the aerosol metering valve system shown in FIGS. 4A-D comprises a distributor 29 which extends coaxially through the metering chamber 1 and which comprises the charging channel 7 formed therein. In this embodiment of the aerosol metering valve system, the piston 5 arranged in the metering chamber 1 tightly surrounds the distributor 29 with the charging channel 7, and when in operation, moves along it while preserving the tightness and the separation of the propulsion space 10 from the dose space 12.

Additionally, in the distributor, there are radially extending additional access channels 25 providing fluid communication between the charging port 2 and the propulsion space 10 of the metering chamber 1. Importantly, in this embodiment the charging opening 9 is arranged at the distal end of the distributor 29 with respect to the charging port 2. In turn, the closure 9 is integrated with the stem block 4 and closes the charging opening 8 after the releasing stem 3 is pressed.

Figure 4:
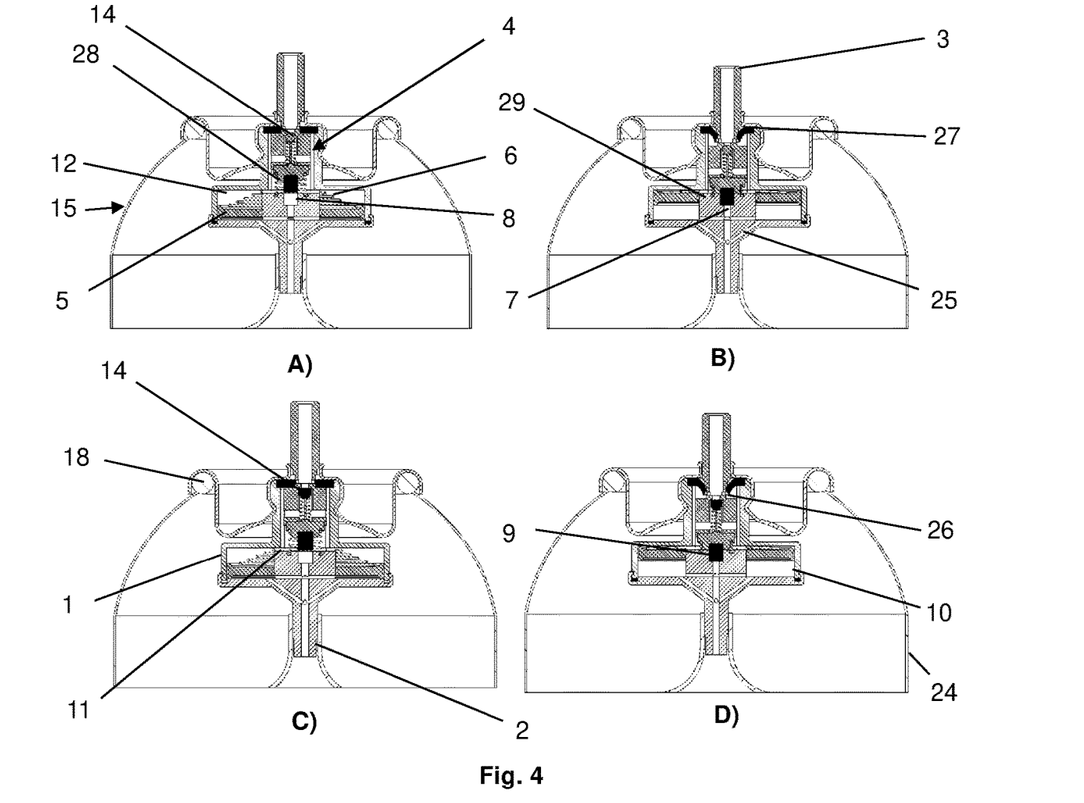
FIGS. 4A-D are a partial longitudinal cross-section of the fourth embodiment of the aerosol metering valve system according to the invention.

Moreover, in a manner similar to the third embodiment, in this embodiment of the aerosol metering valve system there is a filling check valve 14 arranged in the stem block 4, having an analogous function in the system. FIGS. 4A and B show the check valve 14 in the form of a sealing ball with a spring exerting pressure towards the releasing stem 3, while FIGS. 4C and D show the check valve 14 in the form of a piston with a spring exerting pressure towards the releasing stem 3. In alternative embodiments, the check valve 14 may be realized also as any form of a non-return valve, e.g. in the form of a flat gasket.

EXAMPLE 5

Figure 5:
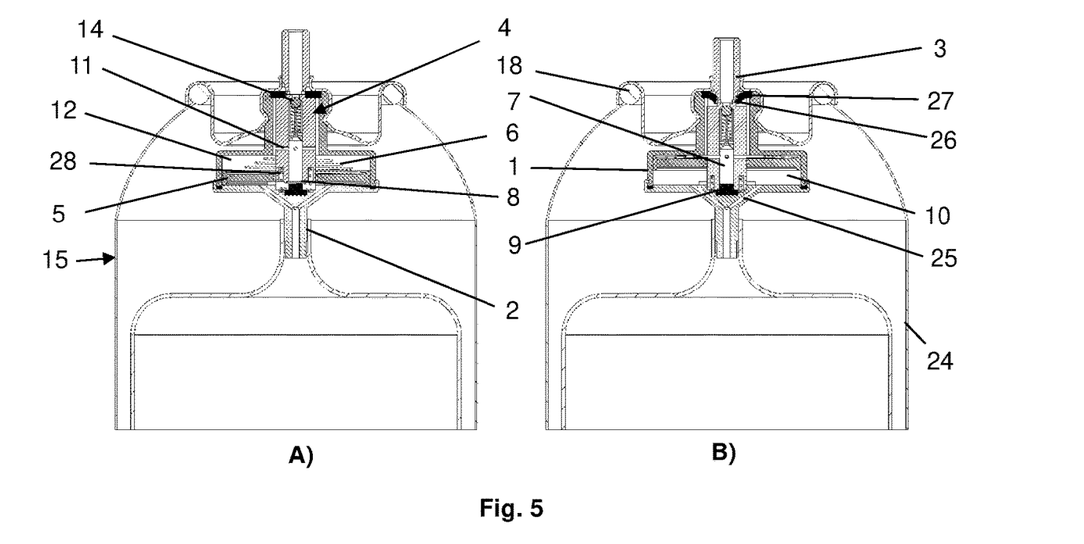
FIGS. 5A-B are a partial longitudinal cross-section of the fifth embodiment of the aerosol metering valve system according to the invention.

The fifth embodiment of the container for storing and dispensing a product of a predefined dose comprising the aerosol metering valve system of this invention is shown in a partial longitudinal cross-section in FIGS. 5A-B. In addition, FIGS. 6A-C show the construction of the releasing stem 3 and the stem block 4 used in this embodiment.

The container with the aerosol metering valve system is similar in construction to the construction of the container with the aerosol metering valve system presented in the fourth embodiment, and therefore similar components will not be described again for the clarity of this disclosure.

Unlike in the fourth embodiment of this invention, the fifth embodiment of the container with the aerosol metering valve system is a solution with a similar construction of the charging channel 7 shown in the first embodiment, i.e. the charging channel 7 is formed in the stem block 4 and extends through it. The distributor 29 shown in the fourth embodiment is not present in this embodiment. The remaining structural elements are similar to the construction of the aerosol metering valve system according to the fourth embodiment.

Figure 6:
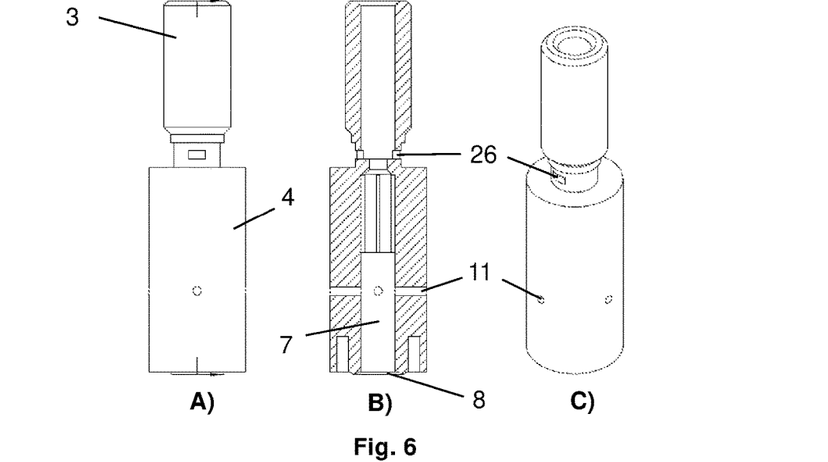
FIGS. 6A-C show various views of the releasing stem with the stem block of the aerosol metering valve system of FIGS. 5A-B.

FIGS. 6A-C show various views of the releasing stem 3 connected with the stem block 4. In the above mentioned figures, there is shown the path of the charging channel 7 and the region of the charging opening 8, as well as of the dose opening 11 and of the outlet opening 26.

EXAMPLE 6

Figure 7:
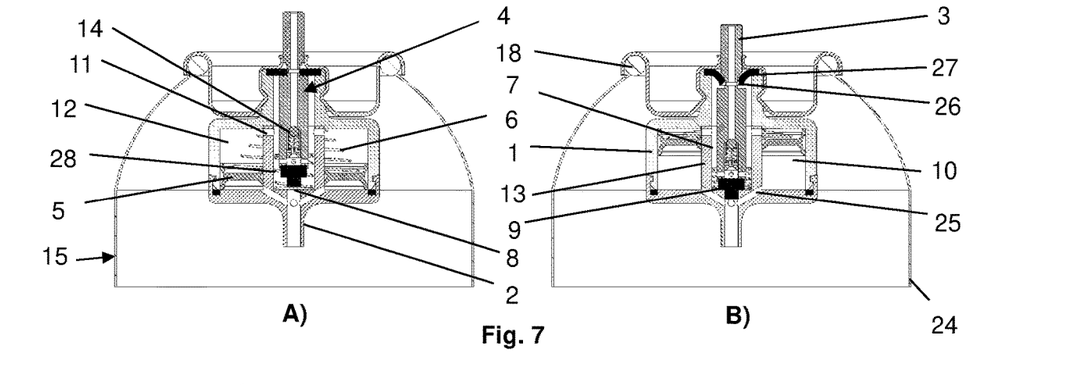
FIGS. 7A-B are a partial longitudinal cross-section of the sixth embodiment of the aerosol metering valve system according to the invention.

The sixth embodiment of the container for storing and dispensing a product of a predefined dose comprising the aerosol metering valve system of this invention is shown in a partial longitudinal cross-section in FIGS. 7A-B. In addition, FIG. 8A-C show the construction of the releasing stem 3 and the stem block 4 used in this embodiment.

The container with the aerosol metering valve system is similar in construction to the construction of the container with the aerosol metering valve system presented in the fifth embodiment, and therefore similar components will not be described again for the clarity of this disclosure.

Unlike in the fifth embodiment of this invention, the sixth embodiment of the container with the aerosol metering valve system is a solution with an identical construction of the charging channel 7 shown in the second embodiment, i.e. the charging channel 7 is formed by the bush 13 which extends through the metering chamber 1. The remaining structural elements are similar to the construction of the aerosol metering valve system according to the fifth embodiment.

Figure 8:
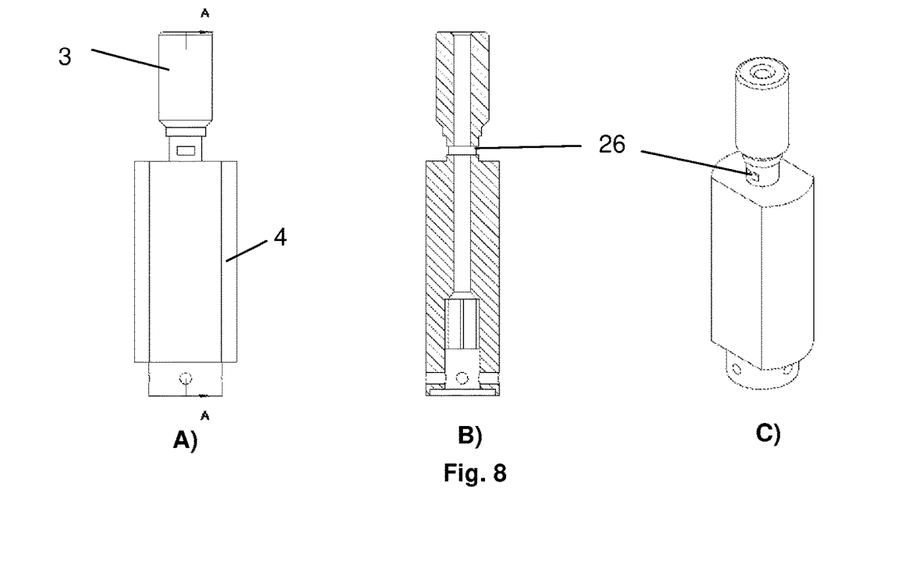
FIGS. 8A-C show various views of the releasing stem with the stem block of the aerosol metering valve system of FIGS. 7A-B.

FIGS. 8A-C show various views of the releasing stem 3 connected with the stem block 4. In the above mentioned figures, there is shown a region of the outlet opening 26. As shown in FIG. 8C, the stem block 4 has a cylindrical structure with two flat surfaces located opposite each other. The function of the identified flat surfaces is to provide a fluid communication inside the bush 13 (the cylindrical surfaces of the releasing stem 3 in the region of stem block 4 have an external diameter corresponding to the internal diameter of the bush 13, ensuring that the releasing stem 3 is properly guided).

EXAMPLE 7

Figure 9:
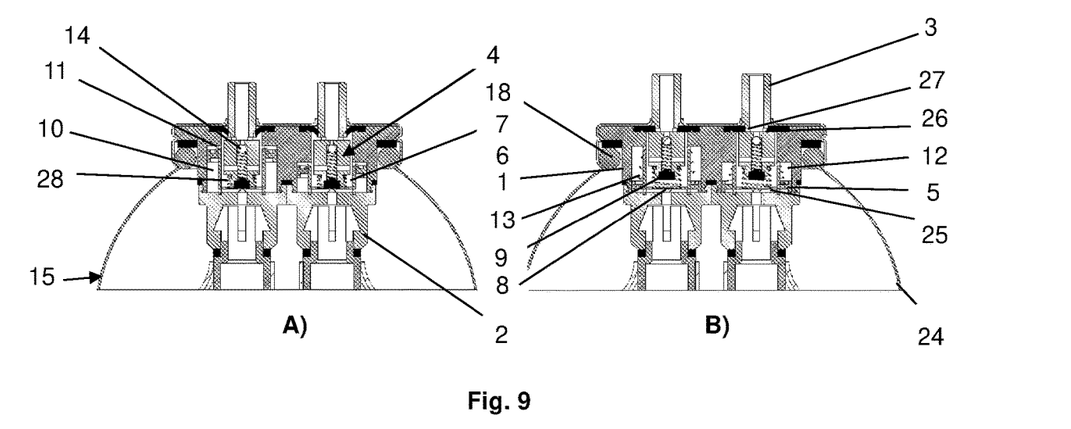
FIGS. 9A-B are a partial longitudinal cross-section of the seventh embodiment of the aerosol metering valve system according to the invention.

The seventh embodiment of the container for storing and dispensing a product of a predefined dose comprising an aerosol dosing valve system of the present invention has been illustrated in the partial longitudinal cross-section in FIGS. 9A-B.

The container with the aerosol metering valve system is similar in construction to the construction of the container with the aerosol metering valve system presented in the sixth embodiment, and therefore similar components will not be described again for the clarity of this disclosure.

Unlike in the sixth embodiment, the seventh embodiment of the container with the aerosol metering valve system comprises two aerosol metering valve systems arranged in one shared aerosol container 15. The construction of the adjacent aerosol metering valve systems is similar, the systems being different only with regard to the volume of the metering chamber 1, thereby providing product doses of two different volumes metered independently, i.e. by means of individual releasing stems 3. Such a solution may have a particular importance when providing the aerosol container 15 in the pharmaceutical industry for metering pharmaceutical products. In the case when doses for patients of different age or different body mass are different, and when the larger dose is not a multiplicity of the smaller dose, it is advantageous to provide an aerosol container 15 allowing independent metering of doses having different volumes. For example, the left metering chamber may have a volume of 5 ml, and the right metering chamber may have a volume of 2 ml, but this is importantly not a limitation to the scope of the present invention.

EXAMPLE 8

Figure 10:
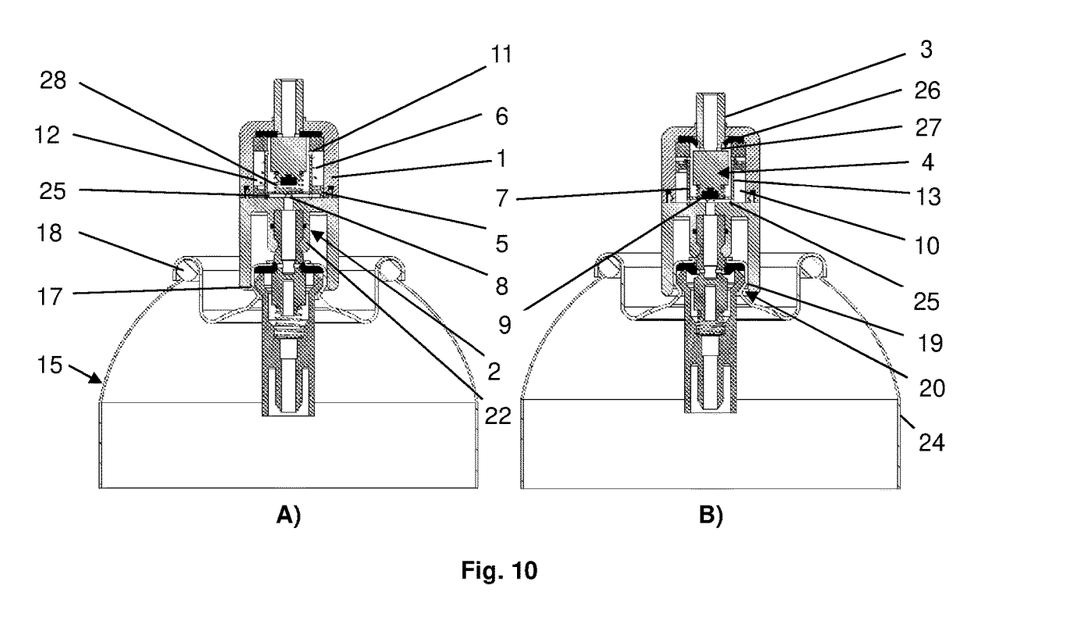
FIGS. 10A-B are a partial longitudinal cross-section of the eighth embodiment of the aerosol metering valve system according to the invention.

The eighth embodiment of the container for storing and dispensing a product of a predefined dose comprising an aerosol dosing valve system of the present invention has been illustrated in the partial longitudinal cross-section in FIGS. 10A-B.

The container with the aerosol metering valve system is similar in construction to the construction of the container with the aerosol metering valve system presented in the second embodiment, and therefore similar components will not be described again for the clarity of this disclosure.

Unlike in the second embodiment, the eighth embodiment of the container with the aerosol metering valve system comprises a charging port 2 for connecting to the releasing stem 3 of the valve of the aerosol container 15 (see FIGS. 10A and B). In this embodiment, the charging port 2 assumes the form of a female valve connector 22 arranged on the stem of the male aerosol valve of the aerosol container 15.

Another important difference lies in the mounting method of the aerosol metering valve system on the aerosol container 15. In this embodiment, the aerosol metering valve system in the form of an adapter is guided slidingly on the aerosol container head 20, with the mounting tooth 17 of the mounting assembly 16 being fastened (snap fitted) to the flange 19 of the aerosol container head. As a result, the entire aerosol metering valve system in the form of an adapter is moved with respect to the aerosol container 15 together with the valve stem of the aerosol container 15, with which it is rigidly connected. In this embodiment, the function of the mounting tooth 17 is to limit the movement of the aerosol metering valve system upwards and to protect it against sliding off the valve stem of the aerosol container 15. In alternative embodiments, this functionality may be provided by the use of an adequate blocking structure located on the valve stem of the aerosol container 15.

EXAMPLE 9

Figure 11:
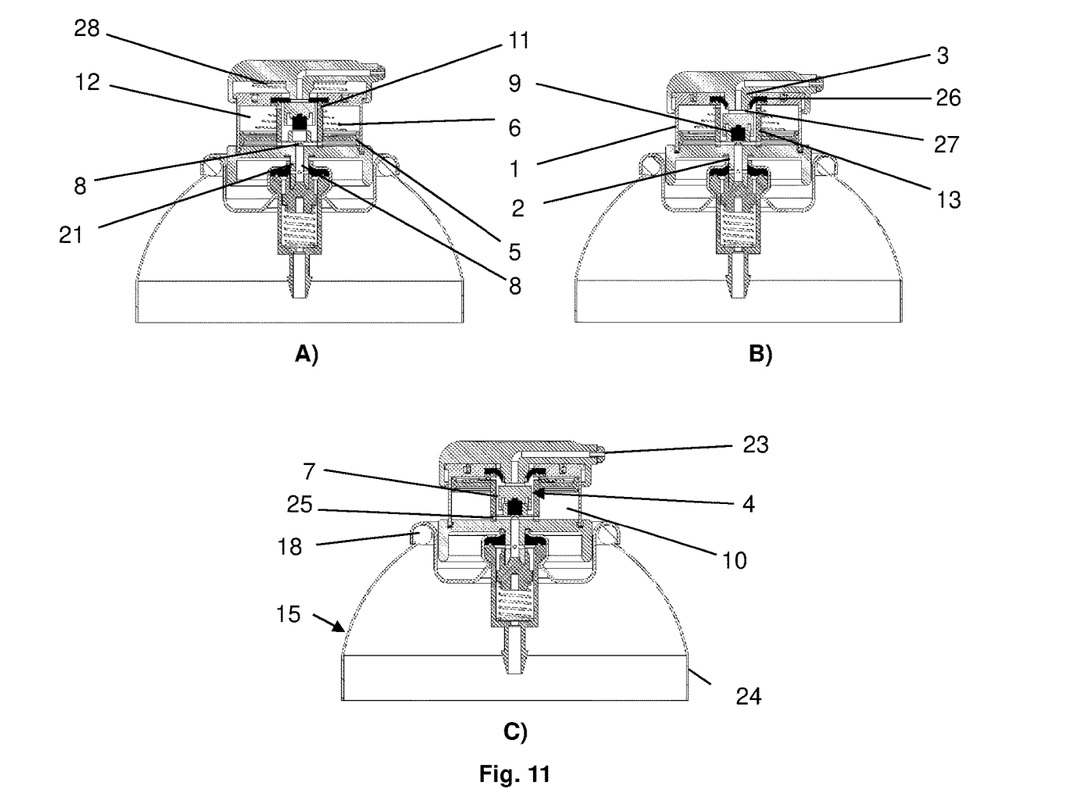
FIGS. 11A-C are a partial longitudinal cross-section of the ninth embodiment of the aerosol metering valve system according to the invention.

The ninth embodiment of the container for storing and dispensing a product of a predefined dose comprising an aerosol dosing valve system of the present invention has been illustrated in the partial longitudinal cross-section in FIGS. 11A-C.

The container with the aerosol metering valve system is similar in construction to the construction of the container with the aerosol metering valve system presented in the second embodiment, and therefore similar components will not be described again for the clarity of this disclosure.

Unlike in the second embodiment of the invention, the ninth embodiment of the container with the aerosol metering valve system is a solution in the form of an adapter, which is rigidly connected with the valve stem of the aerosol container 15, while preserving its ability to move with respect to the aerosol container 15.

Moreover, this embodiment comprises the charging port 2 for connecting with the aerosol container 15 having a female aerosol valve (see FIGS. 11A-C). In this embodiment, the charging port 2 therefore assumes the form of a male valve connector 21 introduced into the receiving seat of the female aerosol valve of the aerosol container 15.

Another important difference lies in the construction of the adapter, which in this embodiment is in the form of a dispensing cap ended with a dispensing nozzle 23. In such a solution, it is not necessary to mount additional dispensing caps on the aerosol metering valve system in the form of an adapter.

It should be also noted that as the aerosol metering valve system is operated, the idle motion of the pressed releasing stem 3 first causes the charging opening 8 to be closed and the outlet opening 26 to be opened. The further movement of the releasing stem 3 opens the valve of the aerosol container 15 and the product flowing into the metering chamber 1 moves the piston 5 upwards, causing the dose prepared above the piston 5 to be released while simultaneously filling the propulsion space 10 below the piston 5. The piston spring 6 will cause the product to be pumped from the propulsion space 10 to the dose space 12 after the releasing stem 3 is released.

Figure 12:
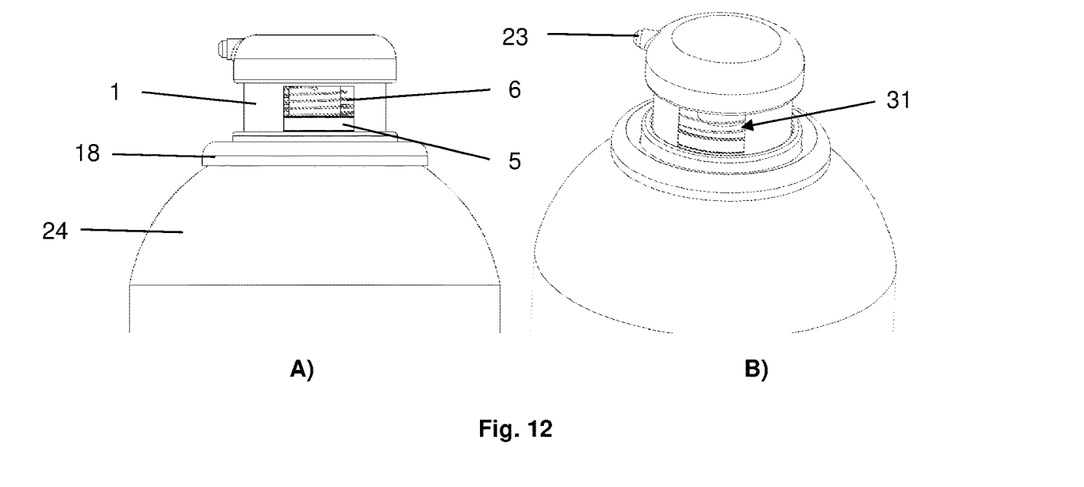
FIGS. 12A-B show a side view and an axonometric view of the embodiment of the aerosol metering valve system of FIGS. 11A-C.

Additionally, as shown in FIGS. 12A and B, the aerosol metering valve system comprises a viewing region 31 provided within the metering chamber 1. The viewing region 31 is made of a transparent or a partially transparent material and extends along the metering chamber 1, on its side wall, at least within the movement range of the piston 5. The purpose of the viewing region 31 is to visualize the position of the piston 5 from outside in order to verify whether the piston 5 reached its terminal position, which confirms a proper dispensation of the dose of a particular volume, or a proper filling of the metering chamber 1.

In alternative embodiments, the viewing region 31 may take the form of a fully transparent or partially transparent metering chamber 1. In another alternative embodiment, the entire aerosol metering valve system is made of a fully transparent or partially transparent plastic.

EXAMPLE 10

Figure 13:
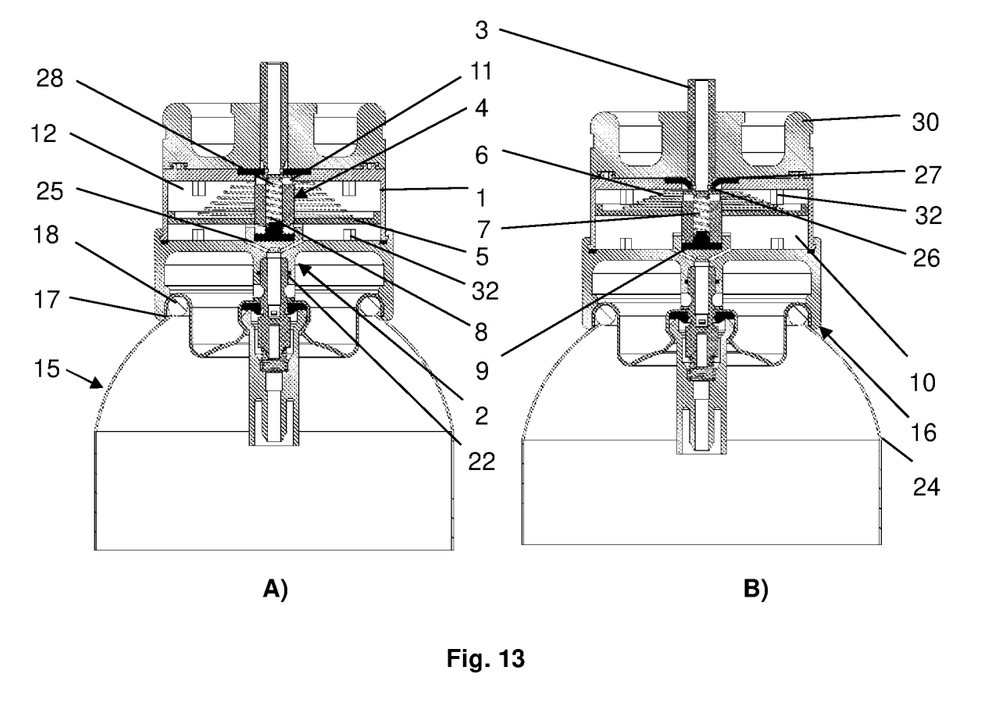
FIGS. 13A-B are a partial longitudinal cross-section of the tenth embodiment of the aerosol metering valve system according to the invention.

The tenth embodiment of the container for storing and dispensing a product of a predefined dose comprising an aerosol dosing valve system of the present invention has been illustrated in the partial longitudinal cross-section in FIGS. 13A-B.

The container with the aerosol metering valve system is similar in construction to the construction of the container with the aerosol metering valve system presented in the first embodiment, and therefore similar components will not be described again for the clarity of this disclosure.

Unlike in the first embodiment, the tenth embodiment of the container with the aerosol metering valve system comprises a limiting structure 32, which limits the movement of the piston 5 by changing its terminal positions. In the embodiment shown in FIGS. 13A and B, two limiting structures 32 are present, one being arranged on the inner surface of the top wall of the metering chamber 1, and the second being arranged on the inner surface of the bottom wall of the metering chamber 1. In this embodiment of the aerosol metering valve system, the limiting structures 32 take the form of protrusions protruding towards the inside of the metering chamber 1, but this is not a limitation to the scope of the invention and in alternative embodiments it is possible to use other limiting elements in the limiting structures 32 on condition of providing a possibility to change the movement range of the piston 5.

In its terminal positions, the piston 5 rests against the limiting structures 32, which prevents its further movement. Importantly, a change in the movement range of the piston 5 allows a change in the volume of the dose which is metered from the aerosol metering valve system of the invention. As shown in the figures, the metering chamber 1 is a separate element which is replaceable. At the step of mounting the aerosol metering valve system, it is possible to select such components which will ensure a dose volume desired for a particular application, e.g. by selecting structural elements of the metering chamber 1 provided with the limiting structures 32 of an adequate volume. Thereby, the possibility to change the dose volume was provided at the step of mounting the aerosol metering valve system, with the identification of the type of the limiting structures 32 being possible due to their different colors or geometries.

LIST OF REFERENCE NUMERALS

1—metering chamber
2—charging port
3—releasing stem
4—stem block
5—piston
6—piston spring
7—charging channel
8—charging opening
9—closure
10—propulsion space 11—dose opening
12—dose space
13—bush
14—filling check valve
15—aerosol container
16—mounting assembly
17—mounting hook
18—flange of the aerosol container
19—flange of the aerosol container head
20—aerosol container head
21—male valve connector
22—female valve connector
23—dispensing nozzle
24—outer casing
25—access channel
26—outlet opening
27—seal
28—stem spring
29—distributor
30—adapter flange
31—viewing region
32—limiting structure

The invention claimed is:

1. An aerosol metering valve system for dispensing a metered dose of product comprising:
   a metering chamber defined by a side wall, a top wall and a bottom wall,
   a charging port extending from the bottom wall of the metering chamber,
   a releasing stem extending from the top wall of the metering chamber, wherein the releasing stem is connected with a stem block extending towards the charging port,
   a piston arranged in the metering chamber and moveable in the metering chamber, and
   a piston spring arranged in the metering chamber, resting with its one end against the piston and exerting pressure on the piston towards the charging port,
   wherein
   there is a charging channel arranged coaxially in the metering chamber,
   wherein the piston tightly surrounds the charging channel,
   wherein the charging channel has a charging opening closed by a closure and connecting the charging channel with a propulsion space under the piston and/or the charging port, and the charging channel has a dose opening connecting the charging channel with a dose space above the piston.

2. The aerosol metering valve system according to claim 1, wherein the charging channel is a bush extending coaxially through the metering chamber in which there is arranged a moveable stem block.

3. The aerosol metering valve system according to claim 1, wherein the charging channel is hollowed out in the stem block.

4. The aerosol metering valve system according to claim 3, wherein there is a filling check valve arranged in the stem block.

5. The aerosol metering valve system according to claim 4, wherein the filling check valve is a ball or a sealing piston subjected to a force exerted by a spring pressing towards the releasing stem.

6. The aerosol metering valve system according to claim 1, wherein the aerosol metering valve system is in a form of an adapter for mounting to an aerosol container and is provided with a mounting assembly.

7. The aerosol metering valve system according to claim 6, wherein the mounting assembly is provided with at least one circumferentially arranged mounting hook for a snap fit connection with a flange of the aerosol container or with a flange of the aerosol container head.

8. The aerosol metering valve system according to claim 7, wherein the charging port is a male valve connector or a female valve connector.

9. The aerosol metering valve system according to claim 6, wherein the aerosol metering valve system has a dispensing nozzle.

10. The aerosol metering valve system according to claim 6, wherein the aerosol metering valve system has, on its external surface around the releasing stem, an adapter annular flange arranged protruding in the direction opposite to the charging port and having its geometrical dimensions substantially corresponding to the dimensions of the flange of the aerosol container.

11. The aerosol metering valve system according to claim 6, wherein the aerosol metering valve system is arranged inside the aerosol container.

12. The aerosol metering valve system according to claim 1, wherein the charging opening is located in the charging channel, at the proximal end relative to the charging port, and the dose opening is located in the charging channel at the proximal end relative to the releasing stem.

13. The aerosol metering valve system according to claim 1, wherein the aerosol metering valve system additionally comprises a viewing region provided within the metering chamber and made of a transparent or a partially transparent material and extending along the metering chamber, on its side wall, at least within the movement range of the piston.

14. The aerosol metering valve system according to claim 1, wherein the aerosol metering valve system additionally comprises a limiting structure for limiting the movement of the piston.

15. A container for storing and dispensing a product of a predefined dose, comprising an outer casing, and an aerosol metering valve system, wherein the aerosol metering valve system is the aerosol metering valve system as defined in claim 1.

16. The container of claim 15, wherein the aerosol metering valve system additionally comprises one or more of the following:
   a dispensing nozzle;
   a viewing region provided within and extending along the metering chamber, on its side wall, at least within the movement range of the piston; or
   a limiting structure for limiting the movement of the piston.

17. A method of mounting the aerosol metering valve system of claim 7 to the aerosol container comprising a valve stem and an aerosol container head, the method comprising:
   slidingly guiding the aerosol metering valve system in the form of the adapter on the aerosol container head with the mounting assembly, wherein a mounting tooth of the mounting assembly is fastened to the flange of the aerosol container head.

18. The method of claim 17, wherein the entire aerosol metering valve system is moved with respect to the aerosol container together with the valve stem of the aerosol container.

19. The method of claim 17, wherein the mounting tooth is configured to limit movement of the aerosol metering valve system upwards.

20. The method of claim 17, wherein the mounting tooth is configured to protect the aerosol metering valve system from sliding off the valve stem of the aerosol container.

\* \* \* \* \*